US008199687B2

(12) United States Patent
Okada (10) Patent No.: US 8,199,687 B2
(45) Date of Patent: Jun. 12, 2012

(54) INFORMATION-COMMUNICATION TERMINAL HAVING FUNCTION OF CONTROLLING ELECTRIC POWER CONSUMPTION (75) Inventor: Koki Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 805 days.

(21) Appl. No.: 12/237,570

(22) Filed: Sep. 25, 2008

(65) Prior Publication Data
US 2009/0086662 A1 Apr. 2, 2009

(30) Foreign Application Priority Data

Sep. 28, 2007 (JP) ................. 2007-253933

(51) Int. Cl.
G08C 17/00 (2006.01)
H04B 1/16 (2006.01)
H04B 1/38 (2006.01)
G06F 1/00 (2006.01)

(52) U.S. Cl. ............... 370/311; 455/343.1; 455/574; 713/300; 713/501

(58) Field of Classification Search .................. None
See application file for complete search history.

(56) References Cited

U.S. PATENT DOCUMENTS 6,311,081 B1* 10/2001 Northcutt et al. ............ 455/574
6,629,256 B1* 9/2003 Ilan et al. ..................... 713/501
2004/0077383 A1* 4/2004 Lappetelainen et al. ....... 455/574
2005/0130705 A1* 6/2005 Shin ........................... 455/556.2
2005/0136882 A1* 6/2005 Boulton ...................... 455/343.4
2005/0144492 A1* 6/2005 Yun et al. ..................... 713/300
2005/0223244 A1* 10/2005 Sinai ........................... 713/300
2006/0031692 A1* 2/2006 Kato et al. ................... 713/300
2007/0213028 A1* 9/2007 Shohara et al. ............ 455/343.1
2008/0069021 A1* 3/2008 Chhabra ...................... 370/311

FOREIGN PATENT DOCUMENTS
JP 2000-115012 4/2000

* cited by examiner

Primary Examiner — Clemence Han
(74) Attorney, Agent, or Firm — Fish & Richardson P.C.

(57) ABSTRACT

A terminal connected to a wireless communication network includes a BU processor used in wireless communication. An operation mode of the BU processor is switched to one of a sleep mode, a standby mode, and an active mode in a state in which an electric power is supplied to the BU processor. In the sleep mode, a PLL circuit stops a clock supplied to each circuit in the BU processor. In the standby mode, an operating frequency is set at a predetermined first frequency. In the active mode, the operating frequency is set at a second frequency higher than the first frequency. Accordingly, in the state in which the electric power is supplied, the operating frequency is switched and the number of operating circuits is switched, thereby reducing electric power consumption in the terminal.

9 Claims, 10 Drawing Sheets

INFORMATION-COMMUNICATION TERMINAL HAVING FUNCTION OF CONTROLLING ELECTRIC POWER CONSUMPTION

BACKGROUND OF THE INVENTION

1. Field of the Invention

The present invention relates to an information-communication terminal, particularly to an information-communication terminal which can reduce electric power consumption.

2. Description of the Background Art

Recently, a wireless communication in which a base station (access point) is not used becomes popular in a plurality of information-communication terminals. A network including only terminals which can conduct the wireless communication without the base station is called an ad hoc network.

There are disclosed various techniques relating to the terminal which can conduct communication in the ad hoc network. For example, Japanese Patent Laying-Open No. 2000-115012 discloses a portable communication device which can easily exchange data in the general public by making transition of an operation mode.

In the technique disclosed in Japanese Patent Laying-Open No. 2000-115012, basically each portable communication device repeatedly transmits a message of itself at intervals of five seconds in order that the general public can exchange the messages among one another. When an energy saving mode (operation mode having a long transmission interval) or a sleep mode (pause) is detected in repeating the message transmission, the operation mode is caused to make the transition to the energy saving mode or sleep mode. In the operation modes such as the energy saving mode and the sleep mode, the transmission interval is lengthened, one of the transmission and reception is stopped, a transmission radio wave is weakened, or the intermittent operation is performed. Because a condition that makes the transition to the energy saving mode or sleep mode depends on the presence or absence of the reception within a predetermined time, it is difficult to finely adjust electric power consumption.

In the wireless LAN (Local Area Network) ad hoc network, reduction of the electric power consumption is demanded because of the portable terminal. However, as described above, only the conventional terminal always waits for the reception, or the conventional terminal makes the transition to the sleep mode or energy saving mode when data cannot be received for a predetermined period. Therefore, there is no proposed a finer countermeasure for the reduction of the electric power consumption.

SUMMARY OF THE INVENTION

An object of the invention is to provide an information-communication terminal which can more finely adjust the electric power consumption.

In order to achieve the above object, according to an aspect of the present invention, an information-communication terminal which conducts communication through a wireless network, the information-communication terminal including a communication unit which conducts communication with an external device through the wireless network using a frame; a power supply unit which supplies an electric power to circuits in the communication unit; a frequency determination unit which determines an operating frequency of the circuits; and a clock circuit which supplies a clock to the circuits in the communication unit, the clock having the operating frequency determined by the frequency determination unit.

An operation mode of the communication unit is switched to one of a sleep mode, a standby mode, and an active mode in a state in which the electric power is supplied to the communication unit, the clock circuit stopping the clock supplied to the circuits in the communication unit in the sleep mode, the frequency determination unit setting the operating frequency at a predetermined first frequency in the standby mode, the frequency determination unit setting the operating frequency at a second frequency higher than the first frequency in the active mode.

Preferably the operation mode of the communication unit is alternately switched between the standby mode and the active mode in a communication waiting period during which the communication unit waits communication using the frame while the electric power is supplied.

Preferably the communication unit includes a timer, and the operation mode of the communication unit is alternately switched between the standby mode and the active mode according to a time measured by the timer in the communication waiting period.

Preferably the information-communication terminal according to the first aspect of the invention further includes an information processing unit which executes an application program. The operation mode of the communication unit is switched among the sleep mode, the standby mode, and the active mode according to an instruction, the instruction being supplied from the application program in such a manner that the information processing unit executes the application program.

Preferably the information processing unit processes the frame received by the communication unit.

Preferably the wireless network is an ad hoc communication network.

Preferably the external device is another information-communication terminal.

In order to achieve the above object, according to another aspect of the present invention, a wireless communication device mounted on an information-communication terminal which conducts communication through a wireless network, the wireless communication device including a communication unit which conducts communication with an external device through the wireless network using a frame; a power supply unit which supplies an electric power to circuits in the communication unit; a frequency determination unit which determines an operating frequency of the circuits; a clock circuit which supplies a clock to the circuits in the communication unit, the clock having the operating frequency determined by the frequency determination unit.

An operation mode of the communication unit is switched to one of a sleep mode, a standby mode, and an active mode in a state in which the electric power is supplied to the communication unit, the clock circuit stopping the clock supplied to the circuits in the communication unit in the sleep mode, the frequency determination unit setting the operating frequency at a predetermined first frequency in the standby mode, the frequency determination unit setting the operating frequency at a second frequency higher than the first frequency in the active mode.

In order to achieve the above object, according to still another aspect of the present invention, a wireless communication network includes a plurality of information-communication terminals, the plurality of information-communication terminals conducting wireless communication with one another wireless communication through the wireless communication network.

A first information-communication terminal in the plurality of information-communication terminals includes a communication unit which conducts wireless communication with a second information-communication terminal in the plurality of information-communication terminals using a frame; a power supply unit which supplies an electric power to circuits in the communication unit; a frequency determination unit which determines an operating frequency of the circuits; and a clock circuit which supplies a clock to the circuits in the communication unit, the clock having the operating frequency determined by the frequency determination unit.

An operation mode of the communication unit is switched to one of a sleep mode, a standby mode, and an active mode in a state in which the electric power is supplied to the communication unit, the clock circuit stopping the clock supplied to the circuits in the communication unit in the sleep mode, the frequency determination unit setting the operating frequency at a predetermined first frequency in the standby mode, the frequency determination unit setting the operating frequency at a second frequency higher than the first frequency in the active mode.

According to the invention, the operation mode of the communication unit is switched to one of the sleep mode, the standby mode, and the active mode in the state in which the electric power is supplied to the communication unit. In the sleep mode, the clock supplied to the circuits in the communication unit is stopped. In the standby mode, the frequency determination unit sets the operating frequency at the predetermined first frequency. In the active mode the frequency determination unit sets the operating frequency at the second frequency higher than the first frequency. Therefore, in the state in which the electric power is supplied, the electric power consumption can be reduced by switching the operating frequency and the electric power consumption can be reduced by switching the number of operating circuits (the circuits in the communication unit are not operated because the clock supply is stopped in the sleep mode).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A wireless communication network according to an embodiment of the invention will be described below with reference to the drawings. In the embodiment, it is assumed that the communication is conducted based on an IEEE (Institute of Electrical and Electronics Engineers, Inc.) 802.11 standard which is one of the wireless LAN (Local Area Network) standards.

Figure 1:
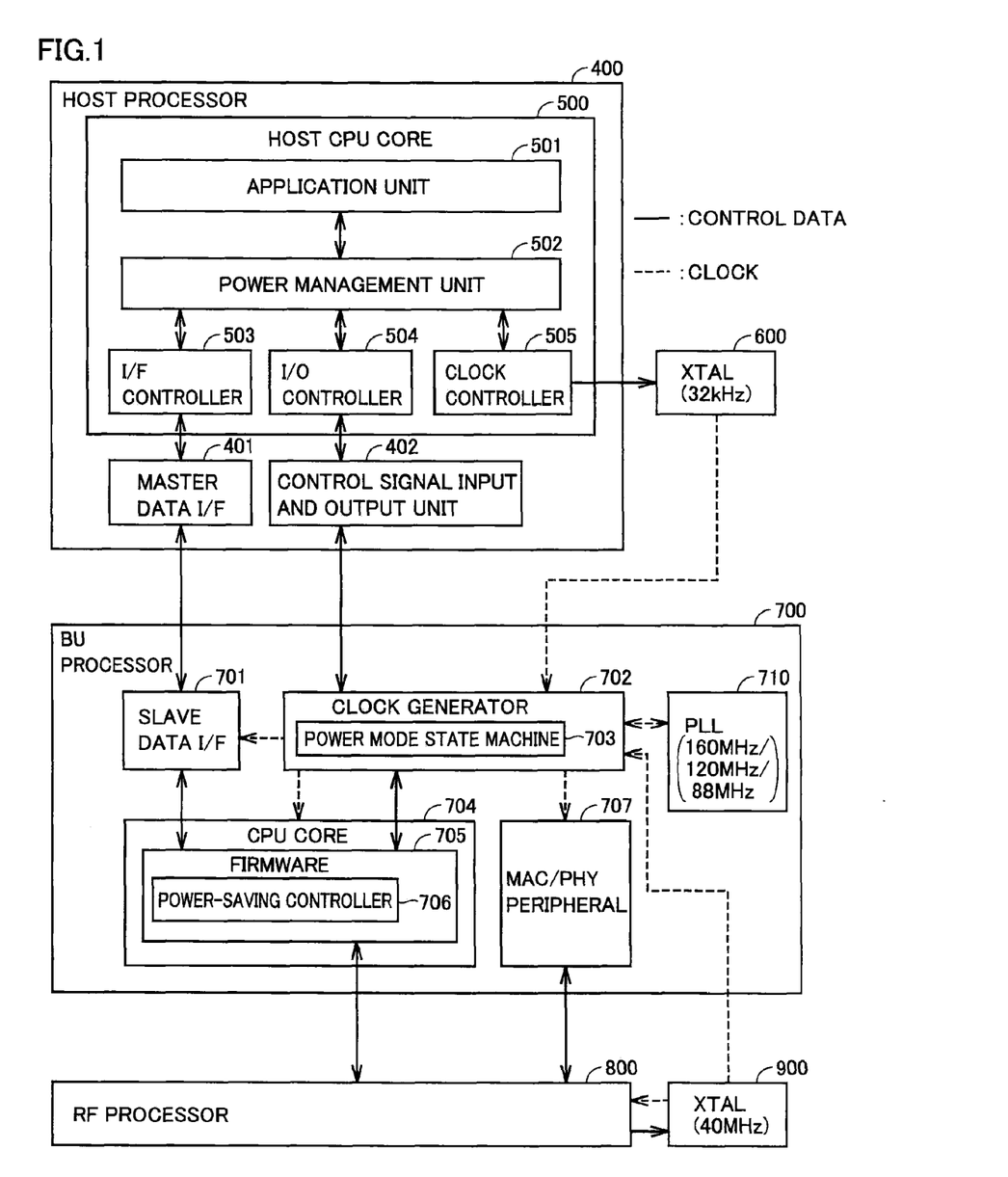
FIG. 1 schematically shows a functional configuration of a terminal according to an embodiment of the invention.
Figure 2:
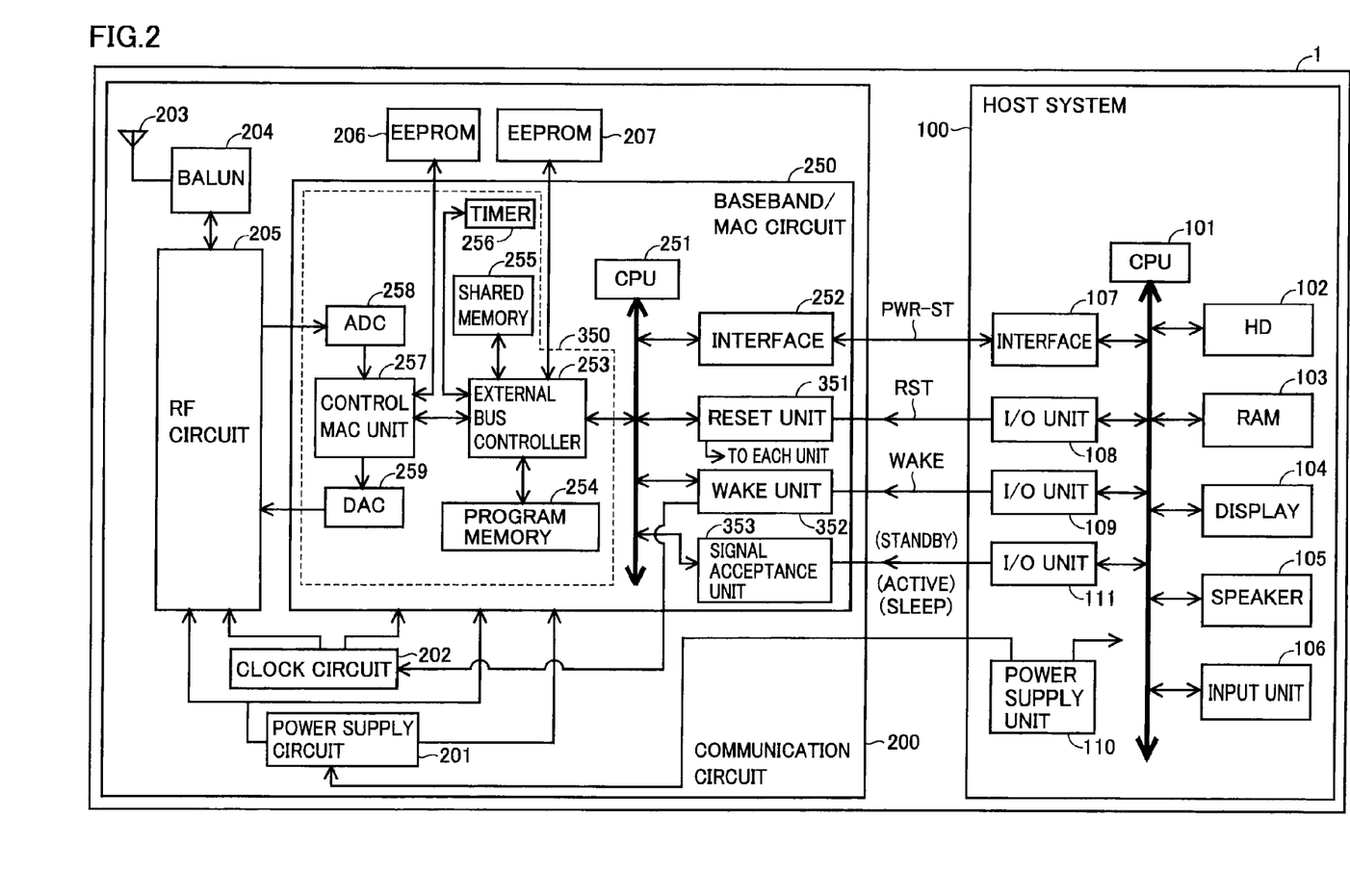
FIG. 2 schematically shows a hardware configuration of the terminal of the embodiment.
Figure 3:
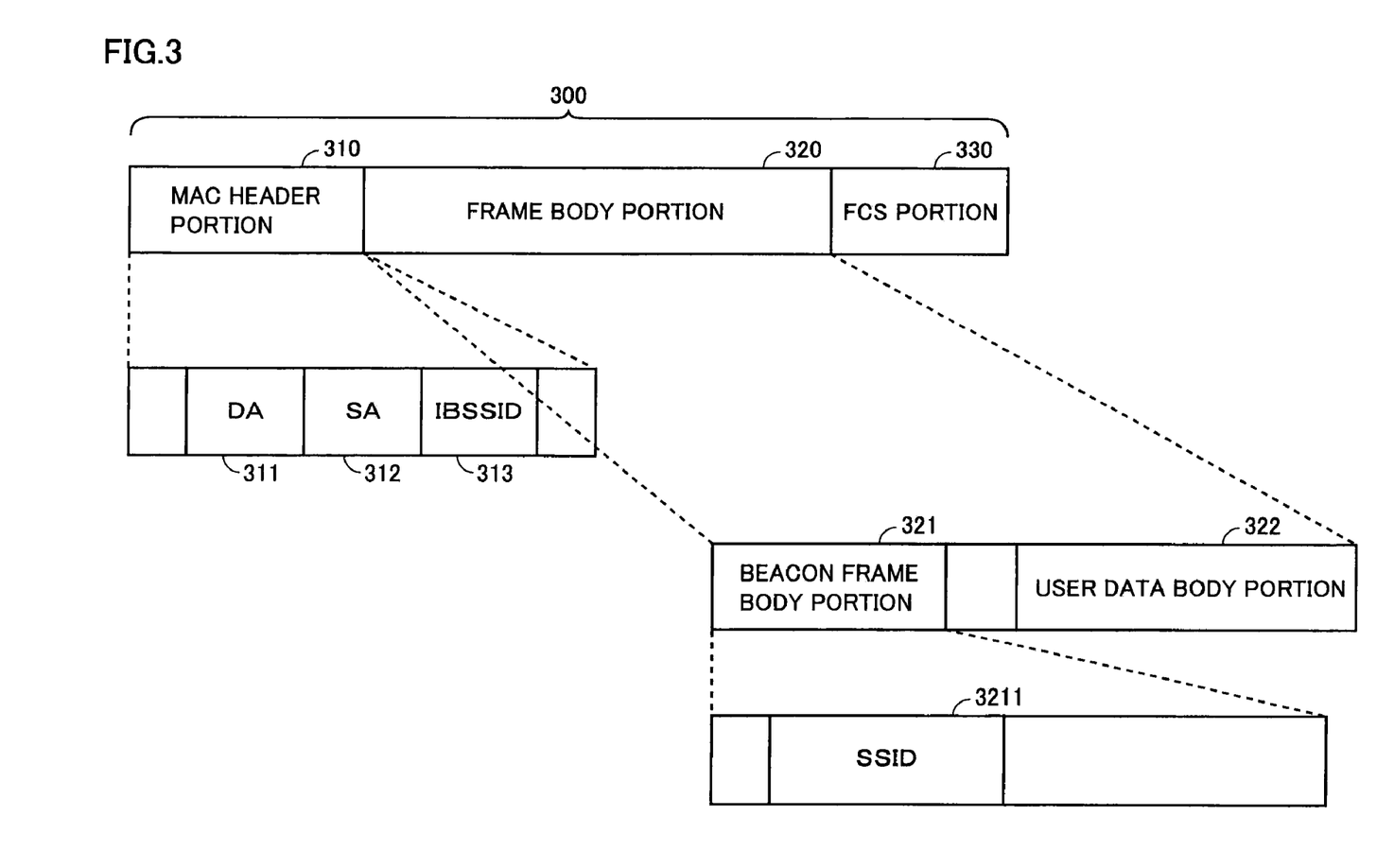
FIG. 3 schematically shows a configuration of a beacon frame transmitted and received in a network of the embodiment.
Figure 4:
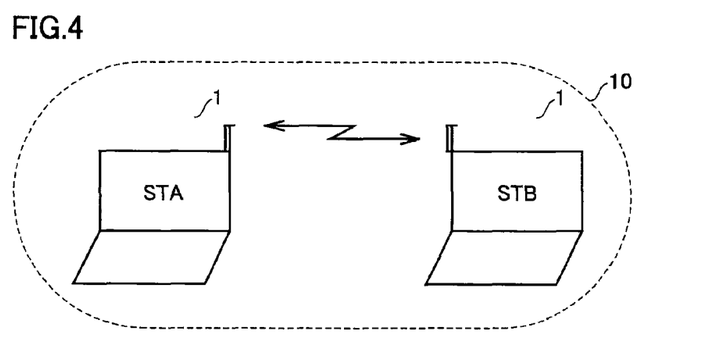
FIG. 4 schematically shows an example of a configuration of an ad hoc network of the embodiment.

FIGS. 1 and 2 show a functional configuration and a hardware configuration of a terminal 1 according to an embodiment of the invention, respectively. FIG. 3 shows a configuration of a frame which conforms to the IEEE 802.11 standard. FIG. 4 schematically shows an example of a configuration of an ad hoc network which is of the wireless communication network of the embodiment.

Referring to FIG. 4, a network 10 includes terminals STA and STB which are of the information-communication terminal of the embodiment. The number of terminals included in network 10 is not limited to two, but network 10 may include at least three terminals. Network 10 is formed by the plurality of information-communication terminals, and network 10 is a wireless communication network (ad hoc network) in which the base station is not used. Terminals STA and STB correspond to terminal 1 having similar function and hardware configuration.

FIG. 2 schematically shows the hardware configuration of terminal 1 of FIG. 1.

Referring to FIG. 2, terminal 1 mainly includes a host system 100 and a communication circuit 200. Host system 100 includes a CPU (Central Processing Unit) 101 which totally controls an operation of host system 100. Host system 100 executes various application programs. Each application program is stored in an HD (Hard Disk) 102. Host system 100 includes an RAM (Random Access Memory) 103 which constitutes a work area of a CPU 101, a display 104 which displays information, a speaker 105 which supplies a sound, an input unit 106 such as a key and a button through which information is supplied from the outside, and a power supply unit 110 which supplies an electric power to each unit of terminal 1. Power supply unit 110 receives the electric power from a battery or a commercial power source (not shown). Host system 100 also includes an interface 107 which exchanges information (signal or data) with communication circuit 200, an I/O unit 108 which supplies a reset signal RST, an I/O unit 109 which supplies a wake signal WAKE, and an I/O unit 111 which supplies a standby signal STANDBY, an active signal ACTIVE, and a sleep signal SLEEP.

Communication circuit 200 includes a baseband/MAC (Media Access Control) circuit 250, an RF (Radio Frequency) circuit 205, a balun 204, an antenna 203, EEPROMs (Electronically Erasable and Programmable Read Only Memory) 206 and 207, a power supply circuit 201, and a clock circuit 202.

Clock circuit 202 generates a clock signal and supplies the generated clock signal to baseband/MAC circuit 250 and RF circuit 205. Power supply circuit 201 controls the electric power supplied from power supply unit 110 to baseband/MAC circuit 250 and RF circuit 205.

RF circuit 205 transmits and receives data through antenna 203. Balun 204 is provided between antenna 203 and RF circuit 205.

Baseband/MAC circuit 250 includes a CPU 251, an interface 252, an MAC/PHY unit 350, a reset unit 351, a wake unit 352, and a signal acceptance unit 353. CPU 251 controls each unit in baseband/MAC circuit 250, and CPU 251 supplies the signal and data to each unit while the signal and data are fed into CPU 251 from each unit. Reset signal RST supplied from host system 100 is fed into reset unit 351, and reset unit 351 supplies reset signal RST to each unit of baseband/MAC circuit 250. Wake signal WAKE supplies from host system 100 is fed into wake unit 352, and wake unit 352 supplies wake signal WAKE to clock circuit 202. Standby signal STANDBY, active signal ACTIVE, and sleep signal SLEEP supplied from host system 100 are fed into signal acceptance unit 353. Interface 252 is one which is used for host system 100, and signal and data except for those described above are supplied from and fed into interface 252 to and from host system 100.

MAC/PHY unit 350 includes an external bus controller 253, a program memory 254, a shared memory 255, a timer 256, a control MAC (Media Access Control) unit 257, an ADC (analog-digital converter) 258, and a DAC (digital-analog converter) 259.

When receiving an instruction for transmitting the data to the network from host system 100, CPU 251 causes interface 252 to read the data stored in a memory (for example, RAM 103) of host system 100. Host system 100 generates transmission instruction data, stores the generated transmission instruction data in the memory, and transmits a transmission instruction of the data to communication circuit 200. The data read by interface 252 is temporally stored in program memory 254 as data constituting a "user data body portion" of a frame to be transmitted to the network.

CPU 251 generates the frame to be transmitted to the network by adding various pieces of data including an MAC (Media Access Control) header and an FCS (Frame Check Sequence) to the data read from program memory 254, and CPU 251 stores the generated frame in program memory 254. CPU 251 sets a flag indicating that the frame is produced at shared memory 255. Referring to FIG. 3, a configuration of a beacon frame which is of an example of the frame transmitted to the network will be described below.

FIG. 3 shows the configuration of the frame which conforms to the IEEE 802.11 standard.

Referring to FIG. 3, a frame 300 includes an MAC header portion 310, a frame body portion 320, and an FCS portion 330.

MAC header portion 310 includes a DA (Destination Address) 311, an SA (Source Address) 312, and an IBSSID (Independent Basic Service Set Identifier) 313. DA 311 is a destination address of frame 300. SA 312 is a source address of frame 300. DA 311 and SA 312 are a 6-byte MAC address. The addresses are stored in EEPROM 206. IBSSID 313 is network identification information for identifying the ad hoc network. In the embodiment, in transmitting the data, terminal 1 can utilize different IBSSIDs according to an attribute of the transmitted data (data of which a transmission request is made from the application program in host system 100). Specifically, a value of IBSSID 313 constituting MAC header portion 310 is changed according to the attribute of the transmitted data.

Frame body portion 320 includes a beacon frame body portion 321 and a user data body portion 322. Beacon frame body portion 321 includes an SSID (Service Set Identifier) 3211. SSID 3211 is information for specifying a name of the network, and the SSID 3211 is set as a character string within 32 bytes. User data body portion 322 includes actually-communicated data (data of which the transmission request is made from the application program executed by host system 100). User data body portion 322 includes 1500-byte data.

Because frame 300 of FIG. 3 is the beacon frame, frame body portion 320 includes pieces of data such as beacon frame body portion 321. However, when frame 300 is the frame used in other applications, the data included in frame body portion 320 is appropriately changed.

FCS portion 330 includes information (FCS) used in frame error detection. Referring to FIG. 2, control MAC unit 257 transmits a transmitting frame stored in program memory 254 to DAC 259, DAC 259 converts the frame into analog data, and the analog data is transmitted to the network through RF circuit 205, balun 204, and antenna 203.

An operation for receiving the data transmitted through the network in communication circuit 200 will be described below. The frame transmitted to RF circuit 205 through antenna 203 and balun 204 is transmitted to control MAC unit 257 after converted into the digital data by ADC 258. Control MAC unit 257 performs frame head detection and time and frequency synchronous processing to the frame converted into the digital signal, and control MAC unit 257 performs error correction decoding. Control MAC unit 257 determines whether or not DA 311 of the frame is matched with the MAC address of communication circuit 200 previously stored in EEPROM 207. When DA 311 is matched with the MAC address, MAC header portion 310 and FCS portion 330 are removed from the frame, and the data (frame body portion 320) remaining in program memory 254 is transferred. When DA 311 is not matched with the MAC address, control MAC unit 257 cancels the received frame.

When the received frame body portion 320 is stored in program memory 254, control MAC unit 257 sets a flag indicating that frame body portion 320 is stored in program memory 254 at shared memory 255. CPU 251 transmits frame body portion 320 stored in program memory 254 to host system 100 through interface 252 according to the setting of the flag.

Referring to FIG. 1, a functional configuration of terminal 1 includes a HOST processor 400, a BU processor 700 and an RF processor 800 which realize a communication function, and crystal oscillators 600 and 900 which generate reference clocks.

HOST processor 400 corresponds to host system 100. HOST processor 400 includes a HOST CPU core 500, a master data I/F (interface) 401, and a control signal input and output unit 402. HOST CPU core 500 includes an application unit 501, a power management unit 502, an I/F controller 503, an I/O controller 504, and a clock controller 505. Power management unit 502 acts as a device driver, and power management unit 502 provides service relating to power-saving control to application unit 501. Clock controller 505 controls crystal oscillator 600. I/F controller 503 controls input and output with master data I/F 401. I/O controller 504 controls input and output with control signal input and output unit 402. Master data I/F 401 and control signal input and output unit 402 correspond to interface 107 and I/O units 108, 109, and 111 of FIG. 2.

Application unit 501 executes various application programs. Sometimes application unit 501 executes the application program according to the user input from input unit 106. The later-mentioned API call and the power mode transition instruction shall mean a command which is supplied according to the execution of the application program. In the specification, the power mode is a generic term of for a plurality of operation modes having different electric power consumptions.

BU processor 700 includes a portion corresponding to baseband/MAC circuit 250. BU processor 700 includes a slave data I/F 701 corresponding to interface 252, a clock generator 702 corresponding to clock circuit 202, a PLL (Phase-Locked Loop) circuit 710 corresponding to clock circuit 202, a CPU core 704 corresponding to CPU 251, and an MAC/PHY peripheral 707 corresponding to MAC/PHY unit 350. RF processor 800 corresponds to RF circuit 205. CPU core 704 includes firmware 705 having a power-saving controller 706.

Clock generator 702 includes a power mode state machine 703. Power mode state machine 703 is a hardware block which manages a power mode state of BU processor 700. Power-saving controller 706 which performs power scheduling is one of functions of firmware 705, and power-saving controller 706 controls power mode switching at a processing level in each scene and turn-on and off of RF processor 800.

Clock generator 702 and PLL circuit 710 determine an operating frequency of BU processor 700 and supply the operating frequency to BU processor 700. Specifically, a CPU clock is supplied as the operating frequency to CPU core 704, and a system clock is supplied to other units. Generally, in the same system (circuit) configuration, as the operating frequency is increased, a processing (operating) speed is enhanced, and the electric power consumption per unit time is also increased according to the enhanced processing speed.

Power-saving controller 706 outputs two kinds of frequency-dividing ratios for determining frequencies (cycles) of the CPU clock and system clock to power mode state machine 703. Power mode state machine 703 supplies the received frequency-dividing ratio (hereinafter referred to as system frequency-dividing ratio) for the system clock to PLL circuit 710. PLL circuit 710 generates a signal (clock) having a cycle following the system frequency-dividing ratio from a reference oscillation signal fed at that time, and PLL circuit 710 supplies the generated signal to power mode state machine 703. Power mode state machine 703 receives the signal, and supplies the received signal as the system clock to each unit.

Power mode state machine 703 also supplies the frequency-dividing ratio (hereinafter referred to as CPU frequency-dividing ratio) for the CPU clock to PLL circuit 710. PLL circuit 710 generates a signal (clock) having a cycle following the CPU frequency-dividing ratio from a reference oscillation signal fed at that time, and PLL circuit 710 supplies the generated signal to power mode state machine 703. Power mode state machine 703 receives the signal, and supplies the received signal as the CPU clock to CPU core 704.

An output signal (oscillation signal) is selectively fed into power mode state machine 703 from one of crystal oscillators 600 and 900 according to the power mode. The output signal supplied from the selected crystal oscillator is imparted as the reference oscillation signal to PLL circuit 710. At this point, crystal oscillator 600 stably oscillates a signal having a cycle of 32 kHz, and crystal oscillator 900 stably oscillates a signal having a cycle of 40 MHz.

Thus, because the clock (system clock and CPU clock) supplied to each unit through PLL circuit 710 and power mode state machine 703 acts so as to determine the operating frequency of each unit, the operating frequency of each unit can be switched by switching the frequency of the supplied clock. Accordingly, the consumption of the electric power supplied to BU processor 700 from power supply circuit 201 can be changed according to the operating frequency of each unit.

Figure 5:
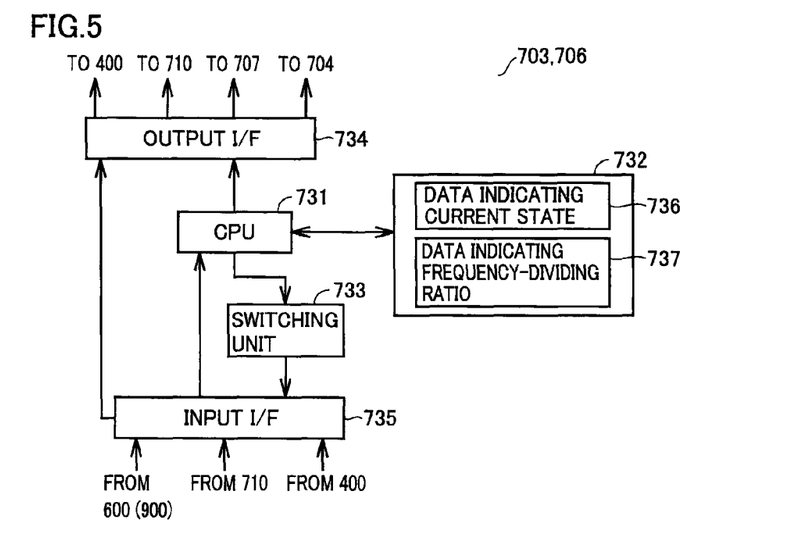
FIG. 5 shows an example of a configuration of a circuit which controls a power mode transition in the terminal of the embodiment.

FIG. 5 shows an example of a circuit configuration which realizes power mode state machine 703 and power-saving controller 706. A part of the circuit of FIG. 5 may be realized by software. Referring to FIG. 5, the circuit includes a CPU 731 (corresponding to CPU 251), a memory 732, an input I/F 735, an output I/F 734, and a switching unit 733. Data 736 indicating a current power mode state and data 737 indicating the frequency-dividing ratio are stored in memory 732. Input I/F 735 accepts inputs from PLL circuit 710 and HOST processor 400, and input I/F 735 also accepts an input from crystal oscillator 600 or 900. Output I/F 734 performs outputs to HOST processor 400, PLL circuit 710, MAC/PHY peripheral 707, and CPU core 704. Data 736 and data 737 of the frequency-dividing ratio stored in memory 732 are retained even if the power supplied to memory 732 is shut down.

Under the control of CPU 731, switching unit 733 performs switching control such that the signal is fed from one of crystal oscillators 600 and 900 through input I/F 735. The signal fed from crystal oscillator 600 (or 900) through input I/F 735 is supplied to PLL circuit 710 through output I/F 734 under the control of CPU 731.

Data 737 of the frequency-dividing ratio is previously stored data, and data 737 has data of the CPU frequency-dividing ratio and data of the system frequency-dividing ratio corresponding to each power mode state.

BU processor 700 has three operation modes, that is, an active mode, a standby mode, and a sleep mode. As the three operation modes differ from one another in the electric power consumption, BU processor 700 controls the operation modes as power modes (active mode, standby mode, and sleep mode). As the frequencies of the CPU clock and system clock which should be supplied in each power mode differ from each other, the electric power consumption in BU processor 700 is switched according to the power mode. The information (information indicating one of the active mode, standby mode, and sleep mode) indicating the current power mode state is stored as data 736 in memory 732 every time the power mode is switched. Accordingly, CPU 731 reads data 736 from memory 732, and CPU 731 determines read data 736, which allows the current power mode state of BU processor 700 to be detected.

Figure 6:
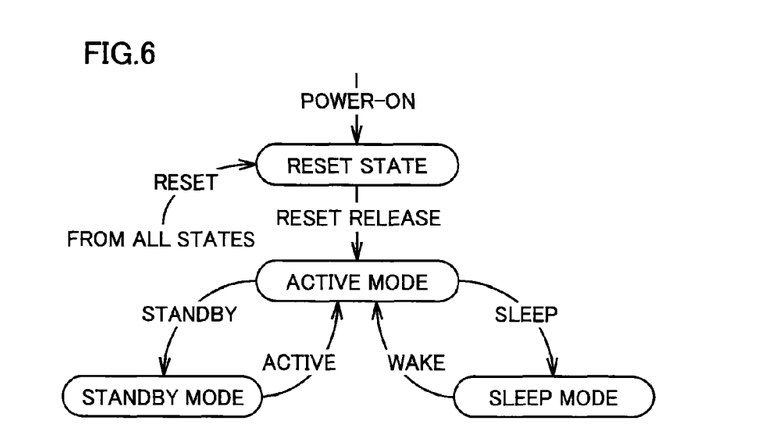
FIG. 6 schematically shows the power mode transition of the embodiment.

FIG. 6 schematically shows the power mode transition of BU processor 700 of the embodiment. Referring to FIG. 6, the active mode is a so-called normal operation mode, and the operation mode is caused to make the transition to the active mode after the reset state is released. In the active mode, the system clock has 120 MHz and the CPU clock has 60 MHz.

In the standby mode, the system clock has 32 kHz and the CPU clock has 16 kHz. Even in the standby mode, because PLL circuit 710 is normally operated, the return to the active mode can instantaneously be performed.

In the sleep mode, clock controller 505 stops the 32-kHz reference oscillation signal supplied from crystal oscillator 600 to BU processor 700, and the supplies of the system clock and CPU clock in BU processor 700 are completely stopped. Therefore, in BU processor 700, the electric power consumption in the sleep mode can be decreased much larger than that of the standby mode.

In the embodiment, when the power mode makes the transition to the sleep mode, the operations of PLL circuit 710 and I/O cell are stopped under the control of CPU 731, and only timer 256 of MAC/PHY peripheral 707 is operated even in the sleep mode period.

Referring to FIGS. 2 and 6, the power mode transition and the control signal will be described. The following signal which is of the signal used in power-saving control is fed into power mode state machine 703 of BU processor 700. The 32-kHz oscillation signal supplied from crystal oscillator 600, the 40-MHz oscillation signal supplied from crystal oscillator 900, and wake-up signal WAKE supplied from application unit 501 through power management unit 502 of HOST processor 400 are fed into power mode state machine 703. A state signal PWR-ST indicating the power mode, supplied from power-saving controller 706, is fed into application unit 501 through power management unit 502 of HOST processor 700.

Power-saving controller 706 generates state signal PWR-ST indicating the power mode, and power-saving controller 706 supplies state signal PWR-ST to power mode state machine 703. For the value of state signal PWR-ST, the value of 0 indicates the active mode, the value of 1 indicates the standby mode, and the value of 2 indicates the sleep mode. Standby signal STANDBY, active signal ACTIVE, and sleep signal SLEEP which are supplied from application unit 501 through power management unit 502 of HOST processor 400 are fed.

During the standby mode, BU processor 700 is operated by the system clock of the 32-kHz oscillation signal supplied from crystal oscillator 600.

Wake-up signal WAKE is a signal which provides an instruction for returning to the active mode from the sleep mode. BU processor 700 makes the transition to the reset state, when the power is turned on (when the electric power supplied from power supply circuit 201 is started), when HOST processor 400 imparts reset signal RST. During the reset state, in BU processor 700, the system clock and the CPU clock are stopped and the operations of all the circuits are stopped.

When HOST processor 400 provides an instruction signal for releasing the reset after the transition to the reset state, the operation mode of BU processor 700 is caused to make the transition to the active mode from the reset state.

During the active mode, the operation mode of BU processor 700 is caused to make the transition to the standby mode when standby signal STANDBY is imparted, and the operation mode is caused to make the transition to the sleep mode when sleep signal SLEEP is imparted.

During the standby mode, the operation mode is caused to make the transition to the active mode when active signal ACTIVE is imparted, and the operation mode is caused to make the transition to the active mode when wake-up signal WAKE is imparted.

Power management unit 502 generates a signal for instructing BU processor 700 to set and change the power mode, that is, a signal for making the state transition of FIG. 6 based on the instruction provided from application unit 501, and power management unit 502 supplies the generated signal to BU processor 700. Power management unit 502 receives state signal PWR-ST indicating the power mode from BU processor 700, and obtains (detects) the current power mode of BU processor 700.

Power-saving controller 706 realizes the following functions relating to the power saving. Power-saving controller 706 performs the transition to the standby mode during processing idling and the return from standby mode during event generation are performed by itself (self) according to an internal scheduler. This is called self standby function. Power-saving controller 706 also realizes a HOST communication function. That is, power-saving controller 706 conducts the communication with power management unit 502 in HOST, and power-saving controller 706 performs processing according to API called by application unit 501. Power-saving controller 706 realizes an RF power control function. That is, power-saving controller 706 controls the electric power of RF processor 800.

Figure 7:
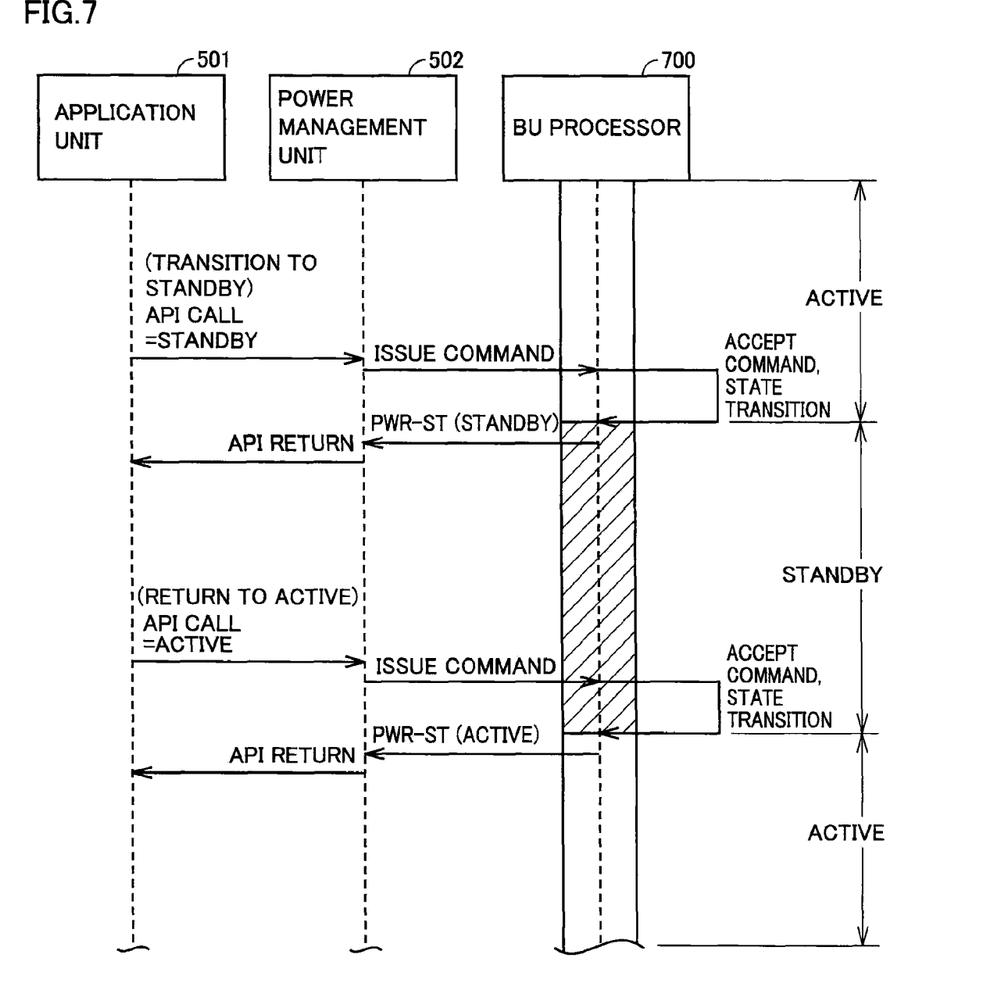
FIG. 7 shows a standby sequence of the embodiment.

Referring to FIGS. 7 to 10, a sequence for controlling the power mode will be described. Referring to FIG. 7, a standby sequence will be described. The standby sequence shall mean a sequence for the transition to the standby mode from the active mode or the return to the active mode from the standby mode.

Referring to FIG. 7, when application unit 501 supplies an API call for instructing BU processor 700 to make the transition to the standby mode while BU processor 700 is in the active mode, power management unit 502 issues (supplies) standby signal STANDBY (command) based on the supplied API call.

Power-saving controller 706 of BU processor 700 accepts the command, and power-saving controller 706 makes the transition of the power mode using power mode state machine 703. Therefore, BU processor 700 makes the transition to the standby mode, and BU processor 700 supplies state signal PWR-ST (STNDBY) indicating the transited power mode to power management unit 502, whereby power management unit 502 supplies the signal PWR-ST as the API return to application unit 501.

During the standby mode, when application unit 501 supplies the API call for instructing the power mode to return to the active mode, power management unit 502 supplies active signal ACTIVE (command) base on the output from application unit 501. Power-saving controller 706 accepts the signal to cause the power mode to make the transition from the standby mode to the active mode through power mode state machine 703. Based on the transition result, power-saving controller 706 generates state signal PWR-ST indicating "ACTIVE", and power-saving controller 706 supplies state signal PWR-ST to power management unit 502 through power mode state machine 703. State signal PWR-ST is fed into power management unit 502, and power management unit 502 supplies the API return to application unit 501 based on state signal PWR-ST.

Figure 8:
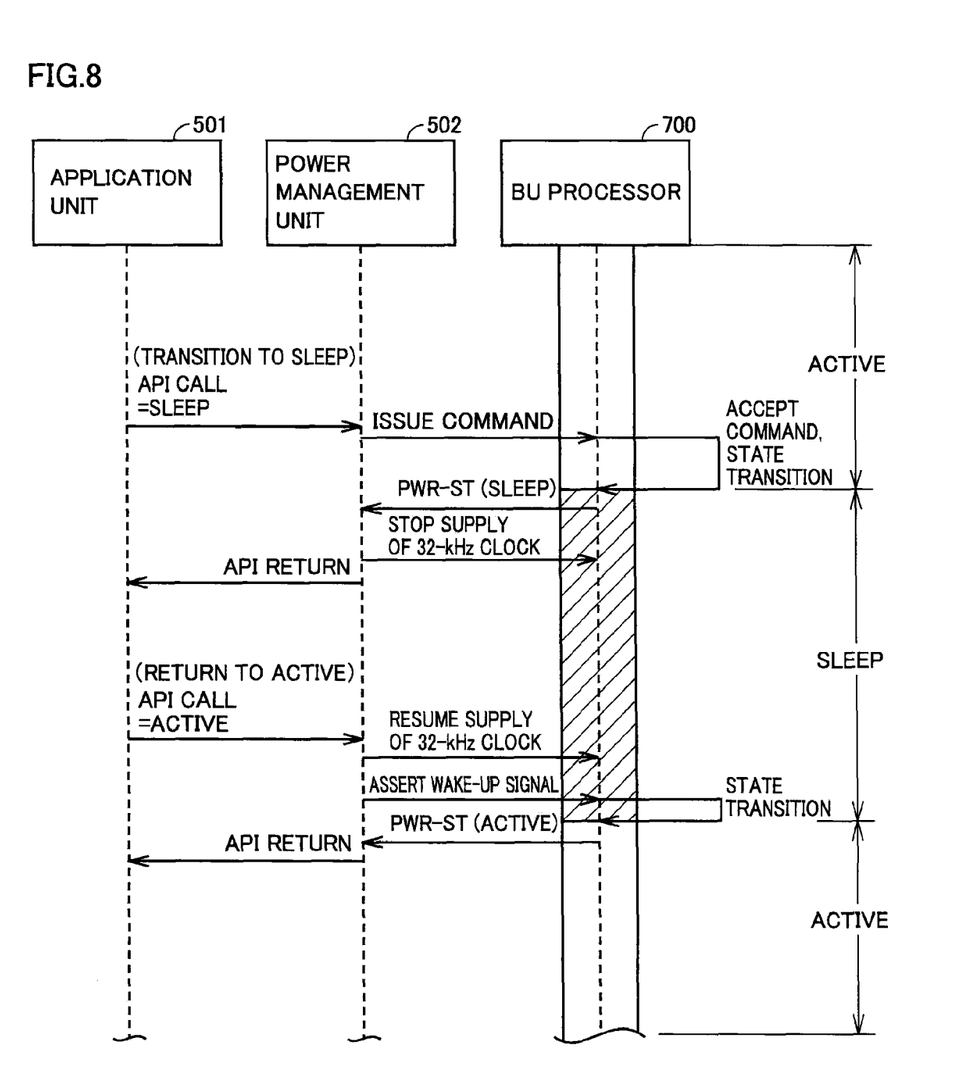
FIG. 8 shows a sleep sequence of the embodiment.

Referring to FIG. 8, the sleep sequence will be described. The sleep sequence of FIG. 8 indicates a transition from the active mode to the sleep mode or a return from the sleep mode to the active mode.

When application unit 501 supplies the API call for instructing the power mode to make the transition to the sleep mode while BU processor 700 is in the active mode, the API call is fed into power management unit 502, and power management unit 502 supplies sleep signal SLEEP. When sleep signal SLEEP is fed into power-saving controller 706 of BU processor 700, power-saving controller 706 causes the power mode of BU processor 700 to make the transition from the active mode to the sleep mode through the power mode state machine 703, power-saving controller 706 generates state signal PWR-ST indication the power mode (SLEEP) which is of the transition result, and power-saving controller 706 supplies state signal PWR-ST to power mode state machine 703.

Power mode state machine 703 supplies state signal PWR-ST to power management unit 502.

When state signal PWR-ST ("SLEEP") is fed into power management unit 502, power management unit 502 stops the reference oscillation signal of crystal oscillator 600 supplied to BU processor 700 through clock controller 505. Power management unit 502 supplies the API return to application unit 501 based on state signal PWR-ST.

When application unit 501 supplies the API call for instructing the power mode to return to the active mode, power management unit 502 controls clock circuit 505 to resume the reference oscillation signal of crystal oscillator 600 supplied to BU processor 700 based on the API call. Therefore, crystal oscillator 600 supplies the 32-kHz reference oscillation signal to BU processor 700. Then, power management unit 502 supplies wake-up signal WAKE to BU processor 700.

When wake-up signal WAKE is fed into power mode state machine 703 of BU processor 700, the sleep mode is released in response to wake-up signal WAKE, and power mode state machine 703 is started up. Specifically, the supply of the CPU clock or system clock to each unit of BU processor 700 is resumed because the operation of PLL circuit 710 is resumed. Therefore, the operation of each unit is resumed.

When the power mode makes the transition from the sleep mode to the active mode, power-saving controller 706 generates state signal PWR-ST ("ACTIVE") to impart state signal PWR-ST ("ACTIVE") to power mode state machine 703. Power mode state machine 703 supplies state signal PWR-ST to power management unit 502. Power management unit 502 generates the API return based on state signal PWR-ST, and power management unit 502 supplies the API return to application unit 501.

Figure 9:
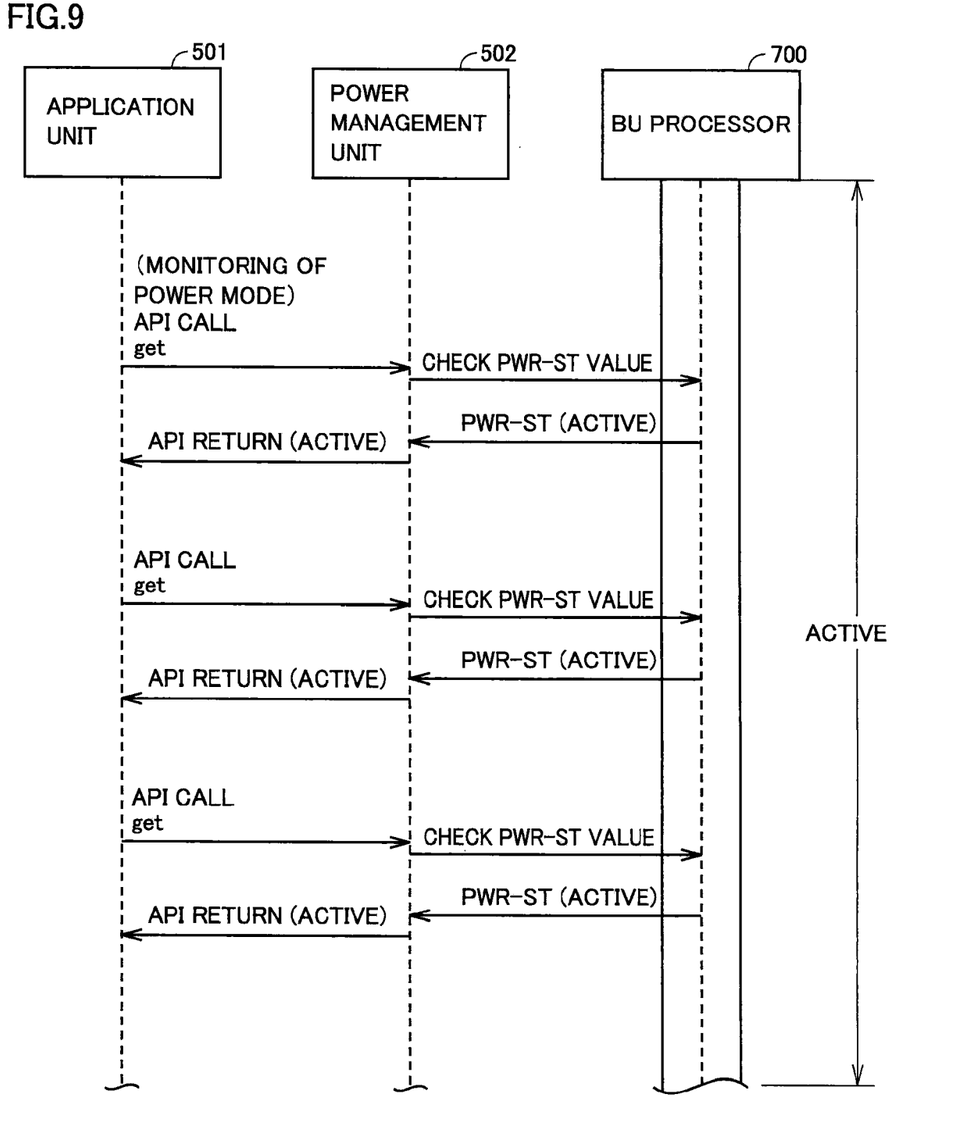
FIG. 9 is a view describing a mode monitor sequence (during a normal operation) of the embodiment.
Figure 10:
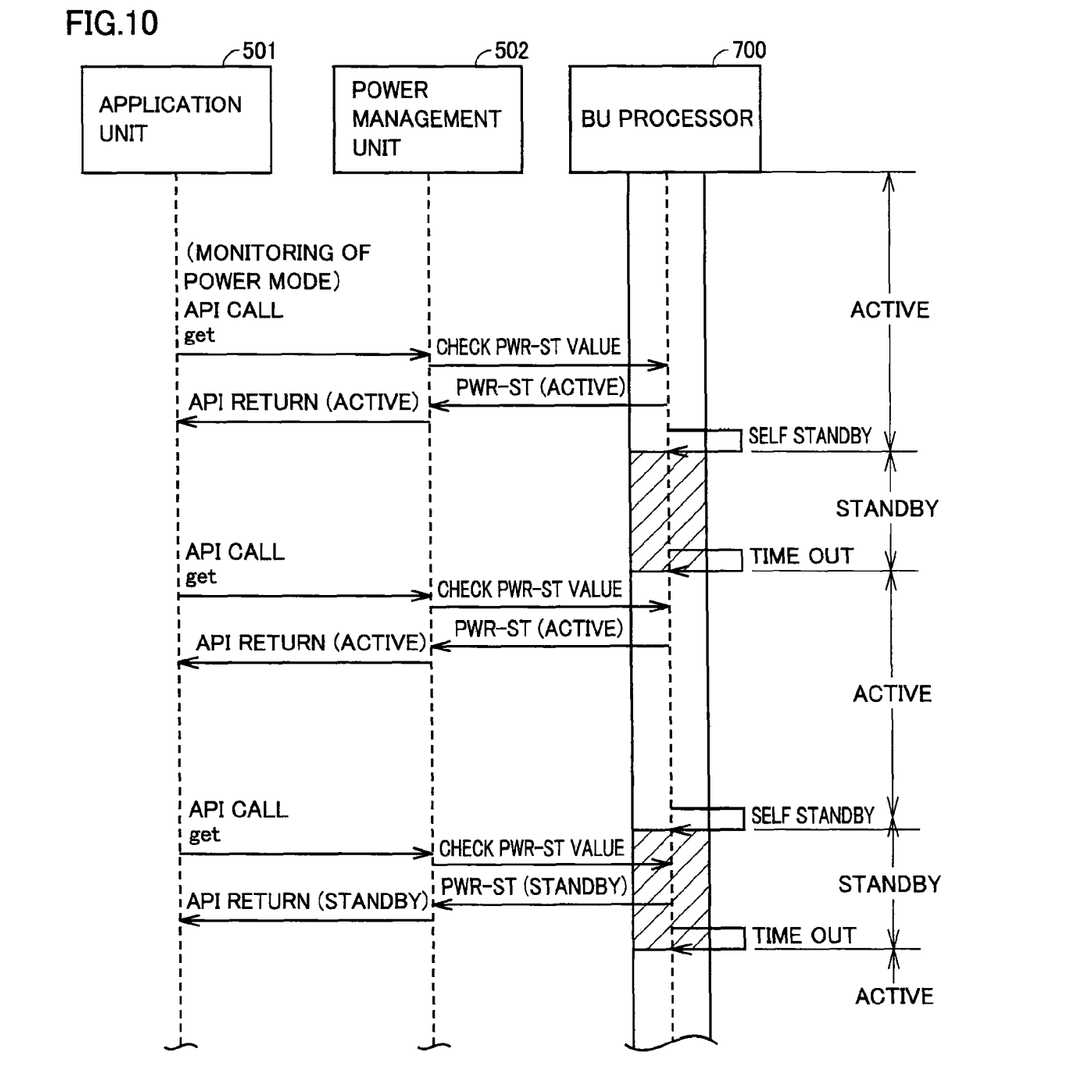
FIG. 10 is a view describing a mode monitor sequence (during a self standby operation) of the embodiment.

As described above, HOST processor 400 can conduct the communication with the BU processor 700 to detect the current power mode in the state in which the power mode makes the transition. Referring to FIGS. 9 and 10, this point will be described below.

FIG. 9 shows a sequence in which HOST processor 400 monitors the power mode while BU processor 700 is always operated in the active mode. When application unit 501 supplies an API call "get" for monitoring the power mode, power management unit 502 provides an instruction for checking the value of state signal PWR-ST to BU processor 700 based on the API call ("get").

When the instruction signal is fed into power-saving controller 706 of BU processor 700, CPU 731 reads data 736 from memory 732, power-saving controller 706 generates state signal PWR-ST ("ACTIVE") indicating the current operation mode based on data 736, and power-saving controller 706 supplies state signal PWR-ST ("ACTIVE") to power mode state machine 703. Power mode state machine 703 receives state signal PWR-ST, and supplies the received state signal PWR-ST to power management unit 502. Power management unit 502 generates the API return ("ACTIVE") based on state signal PWR-ST to supply the generated API return ("ACTIVE") to application unit 501.

The series of sequences from the output of the API call "get" with application unit 501 to the acquisition of the API return is repeated every time application unit 501 supplies the API call. Therefore, HOST processor 400 can monitor (detect) the current power mode in BU processor 700.

FIG. 10 shows a sequence for monitoring the power mode from HOST processor 400 while BU processor 700 is in the self standby operation. As used herein, the self standby operation of BU processor 700 shall mean that BU processor 700 determines by itself to make the transition from the active mode to the standby mode or from the standby mode to the active mode. Even in the transition of the power mode, as described above, CPU 731 updates data 736 in each transition such that data 736 indicates the current power mode state, CPU 731 switches crystal oscillators 600 and 900 through switching unit 733, and CPU 731 reads data 737 of the frequency-dividing ratio according to the power mode.

In the state in which the electric power is supplied to BU processor 700, BU processor 700 is set at a communication waiting period during which BU processor 700 waits for conducting the communication with a frame of another terminal 1. The communication waiting period includes the active mode and the standby mode. For example, when CPU 251 detects that a certain condition is satisfies in the active mode, CPU 251 forcedly causes the power mode to make the transition from the active mode to the standby mode by determination thereof without receiving the instruction from HOST processor 400. A certain condition is the case where control MAC unit 257 detects that a period during which "the data to be transmitted to the outside through RF circuit 205 is not supplied from host system 100" is continued after timer 256 measures a predetermined period, or a certain condition is the case where control MAC unit 257 detects that a period during which the data of the frame of FIG. 3 is not received from external terminal 1 through control MAC unit 257 is continued after timer 256 measures the predetermined period.

In the standby mode after the transition, when control MAC unit 257 detects that the standby mode is continued for the predetermined period measured by timer 256 (this is called time out), the power mode is caused to forcedly make the transition from the standby mode to the active mode with no instruction of HOST processor 400.

In FIG. 10, the transition is dynamically made between the standby mode and the active mode while the communication waiting period is measured by timer 256. Alternatively, the transition may repeatedly be made between the standby mode and the active mode at predetermined intervals irrespective of a length of the communication waiting period.

In the self standby mode, the wasted electric power consumption can be decreased in BU processor 700.

In the state in which the power mode transition is made according to the self standby in BU processor 700, similarly to the sequence of FIG. 9, the API return ("ACTIVE" or "STANDBY") based on state signal PWR-ST indicating the current power mode can be fed into application unit 501 by issues the API call ("get") as shown in FIG. 10. Accordingly, HOST processor 400 can also monitor (detect) the power mode while BU processor 700 is in the self standby mode.

The operation performed by the circuit of FIG. 5 in the sequence will be described with reference to flowcharts of FIGS. 11 to 13. For the sake of easy description, the power mode transition processing of the self standby is not given.

Figure 11:
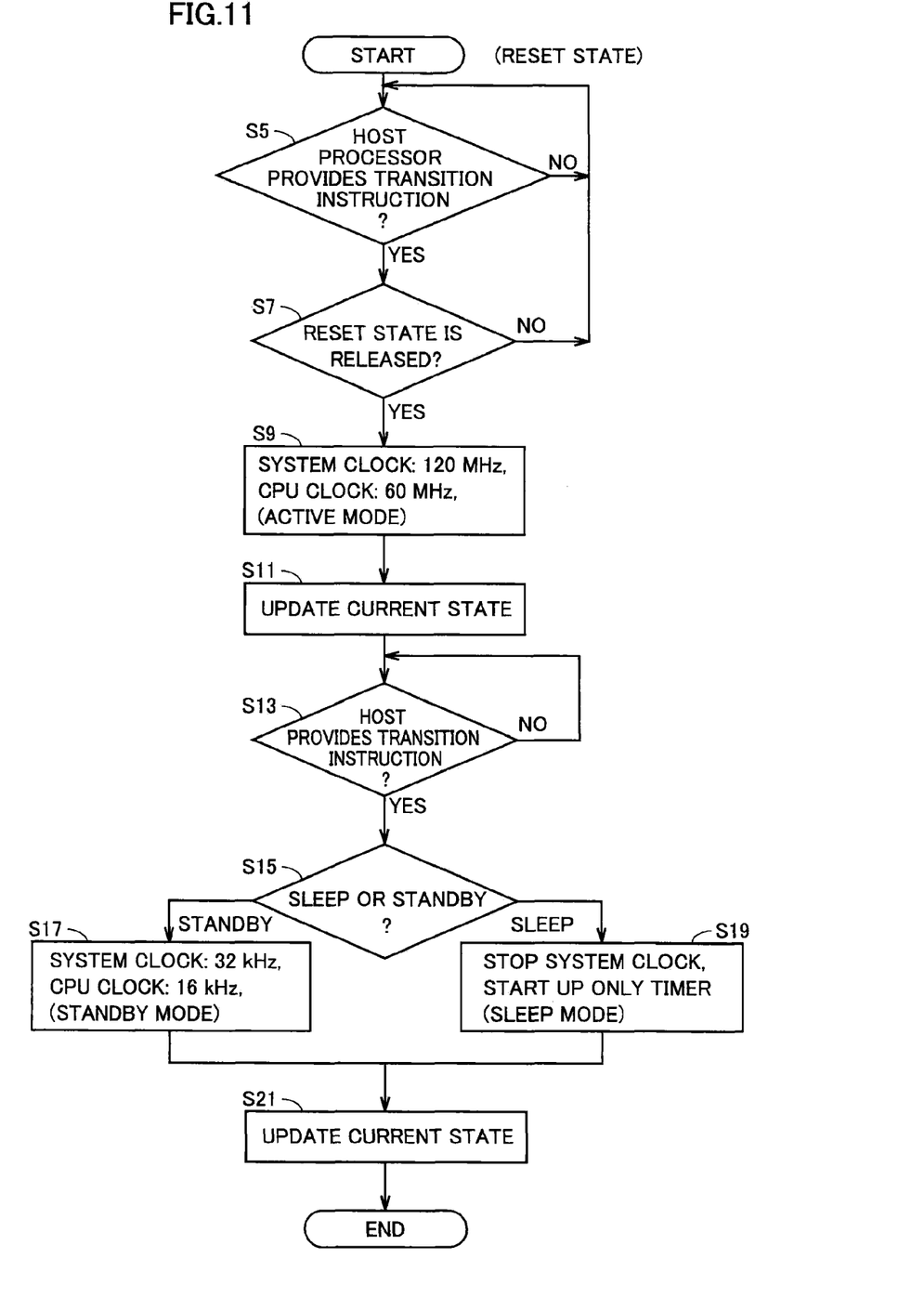
FIG. 11 is a flowchart processed by a BU processor, and the flowchart is started in a reset state of the terminal of the embodiment.

Referring to FIG. 11, the transition from the reset state in BU processor 700 will be described. As shown in FIG. 6, in the reset state, the transition can be made to another mode by imparting the rest release signal from HOST processor 400. It is assumed that CPU 731 detects that the current state is the reset state based on data 736 read from memory 732.

CPU 731 detects whether or not HOST processor 400 imparts a transition instruction signal (command) through input I/F 735 (Step S5). When the transition instruction signal is not detected, processing in Step S5 is repeated.

On the other hand, when the transition instruction signal is fed into CPU 251 (YES in Step S5), CPU 731 determines whether or not the fed instruction signal is the instruction signal for releasing the reset state (Step S7). When the instruction signal is the instruction signal for releasing the reset state (YES in Step S7), CPU 731 provides an instruction for feeding the reference oscillation signal of crystal oscillator 900 in crystal oscillators 600 and 900 to switching unit 733 in order to make the transition to the active mode. Input I/F 735 supplies the oscillation signal from crystal oscillator 900 to PLL circuit 710 through output I/F 734 under the control of switching unit 733. At this point, CPU 731 reads the CPU frequency-dividing ratio and system frequency-dividing ratio of data 737 corresponding to the reset release signal stored in memory 732, that is, corresponding to the active mode based on the reset release instruction signal, and CPU 731 supplies the CPU frequency-dividing ratio and system frequency-dividing ratio of data 737 to PLL circuit 710 through output I/F 734. Accordingly, PLL circuit 710 performs the frequency dividing to the oscillation signal supplied from crystal oscillator 900 according to the frequency-dividing ratio, and then PLL circuit 710 supplies the frequency-divided oscillation signal.

The 60-MHz CPU clock is imparted to CPU core 704 by the frequency-divided signal supplied from PLL circuit 710, and the 120-MHz system clock is imparted to other units of BU processor 700 (Step S9). CPU 731 updates data 736 of memory 732 such that data 736 indicates "active mode" (Step S1).

CPU 731 determines whether or not HOST processor 400 provides the transition instruction (command) through input I/F 735 (Step S13). When CPU 731 determines that HOST processor 400 does not provide the transition instruction (NO in Step S13), processing in Step S13 is repeated. When CPU 731 determines that HOST processor 400 provides the transition instruction (YES in Step S13), CPU 731 determines whether or not the transition instruction instructs the power mode to make the transition to "SLEEP" or "STANDBY". In the embodiment, as shown in FIG. 6, HOST processor 400 imparts one of instruction signals STANDBY and SLEEP in the active mode.

CPU 731 determines that instruction signal "STANDBY" is imparted (YES in Step S13 and Step S15), CPU 731 controls switching unit 733 such that the oscillation signal supplied from input I/F 735 is switched to the input from the side of crystal oscillator 600. Therefore, the reference oscillation signal fed into PLL circuit 710 is switched from the side of crystal oscillator 900 to side of crystal oscillator 600.

At this point, CPU 731 reads data 737 of the CPU frequency-dividing ratio and system frequency-dividing ratio corresponding to imparted signal "STANDBY", that is, corresponding to the standby mode from memory 732, and CPU 731 imparts data 737 of the CPU frequency-dividing ratio and system frequency-dividing ratio to PLL circuit 710. Accordingly, based on the supplied data 737 of frequency-dividing ratio, PLL circuit 710 performs the frequency dividing to the reference oscillation signal to generate the 32-kHz system clock and the 16-kHz CPU clock, and PLL circuit 710 supplies the generated clocks through input I/F 735 (Step S17). The CPU clock (16 kHz) is imparted to CPU core 704, and the system clock (32 kHz) is imparted to other units of BU processor 700.

Thus, in BU processor 700, the number of circuits operated in the standby mode is equal to that in the active mode. However, the signal frequency for the operation in the standby mode is lower than that in the active mode, so that the electric power consumption per unit time can be reduced compared with the active mode.

On the other hand, when CPU 731 determines that instruction signal "SLEEP" is imparted (YES in Step S13 and Step S15), CPU 731 performs control switching unit 733 such that the reference oscillation signal is supplied from the side of crystal oscillator 600. Power management unit 502 stops the reference oscillation signal supplied to BU processor 700 of crystal oscillator 600 through clock controller 505 in response to the output of the transition instruction signal of "SLEEP". The operation of PLL circuit 710 is also stopped. Therefore, the supplies of the system clock and CPU clock are stopped.

At this point, CPU 731 provides a start-up instruction only to timer 256 of MAC/PHY peripheral 707 according to the supply of the transition instruction signal of "SLEEP". Therefore, in the sleep mode, timer 256 performs timer counting operation using the supplied electric power (Step S19). Thus, in the sleep mode, only timer 256 is operated while the operations of other circuits are stopped because PLL circuit 710 does not supply the CPU clock and the system clock, so that the electric power consumption can further be reduced compared with the standby mode.

Then, CPU 731 updates data 736 of memory 732 according to the transited power mode such that data 736 indicates one of "standby mode" and "sleep mode" (Step S21). Even if the power mode makes the transition to the sleep mode (Step S19), because the data update in memory 732 is performed for an extremely short time, it is assumed that the rewriting period is ended before the supply of the CPU clock is stopped.

Figure 12:
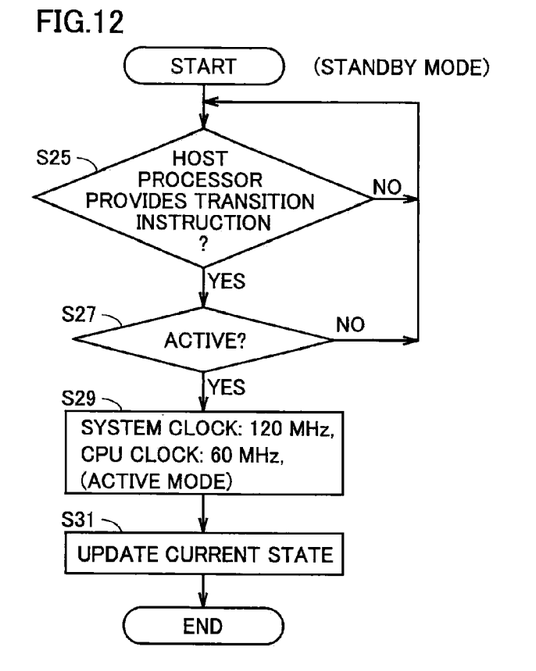
FIG. 12 is a flowchart processed by the BU processor, and the flowchart is started in a standby mode of the terminal of the embodiment.

FIG. 12 shows a sequence for making the state transition in the standby mode. As shown in FIG. 6, during the standby mode, the state transition is made only based on the active instruction signal imparted from HOST processor 400. The power mode is caused to make the transition from the standby mode to the active mode when the active instruction signal is imparted.

CPU 731 determines whether or not HOST processor 400 imparts the transition instruction signal (Step S25). When CPU 731 determines that HOST processor 400 does not impart the transition instruction signal (NO in Step S25), processing in Step S25 is repeated. When CPU 731 determines that HOST processor 400 imparts the transition instruction signal (YES in Step S25), CPU 731 determines whether or not the transition instruction signal indicates "ACTIVE" (Step S27).

When CPU 731 determines that the transition instruction signal does not indicate "ACTIVE" (NO in Step S27), the flow returns to processing in Step S25. On the other hand, when CPU 731 determines that the transition instruction signal indicates "ACTIVE" (YES in Step S27), CPU 731 controls switching unit 733 such that the reference oscillation signal to be supplied from input I/F 735 is supplied from the side of crystal oscillator 900. Therefore, the reference oscillation signal is supplied from crystal oscillator 900 through input I/F 735, and the supplied reference oscillation signal is imparted to PLL circuit 710 through output I/F 734.

At this point, CPU 731 reads data 737 of the CPU frequency-dividing ratio and system frequency-dividing ratio corresponding to the imparted state transition instruction signal ("ACTIVE"), that is, the active mode, and CPU 731 imparts data 737 to PLL circuit 710. Accordingly, PLL circuit 710 performs the frequency dividing to the reference oscillation signal imparted from crystal oscillator 900 according to the frequency-dividing ratio data imparted from power mode state machine 703. The system clock (120 MHz) and CPU clock (60 MHz) signals are generated and supplied by the frequency dividing. Therefore, the 60-MHz CPU clock is supplied to CPU core 704 and the 120-MHz system clock is supplied to other units of BU processor 700 (Step S29). CPU 731 updates data 736 of memory 732 such that data 736 indicates "active mode" (Step S31).

Figure 13:
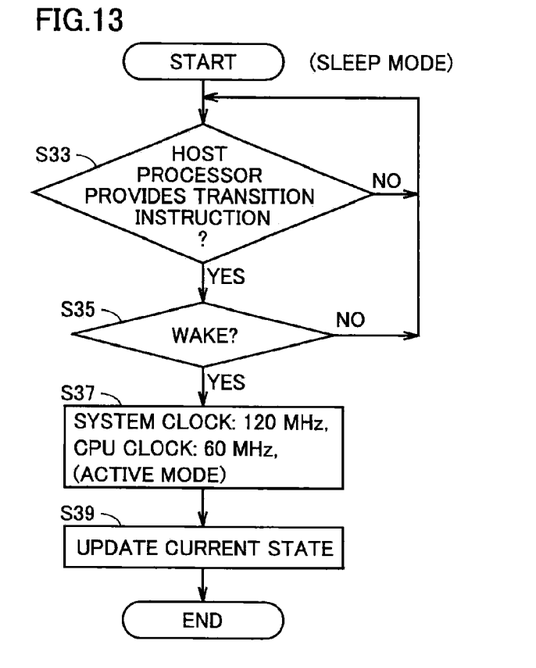
FIG. 13 is a flowchart processed by the BU processor, and the flowchart is started in a sleep mode of the terminal of the embodiment.

Referring to FIG. 13, the state transition in the sleep mode will be described. When BU processor 700 is in the sleep mode, HOST processor 400 supplies the transition instruction signal of "WAKE" to clock circuit 202 through wake unit 352. HOST processor 400 supplies the transition instruction signal of "WAKE", power management unit 502 controls clock controller 505 to release the stop of the reference oscillation signal supplies from crystal oscillator 600 to BU processor 700. Therefore, the supply of the reference oscillation signal to PLL circuit 710 is resumed. At this point, PLL circuit 710 generates and supplies the system clock and CPU clock according to the frequency-dividing ratio previously determined based on the reference oscillation signal or the frequency-dividing ratio imparted before the stop of the supply of the reference oscillation signal. Therefore, the CPU clock is supplied to CPU core 704 of BU processor 700 and the system clock is supplied to other units of BU processor 700, thereby operating all the circuits.

Then, when CPU 731 determines that the transition instruction signal is supplied from HOST processor 400 (YES in Step S33), CPU 731 determines that transition instruction indicates "WAKE" (YES in Step S35). The flow returns to processing in Step S33, when CPU 731 determines that the transition instruction signal is not supplied (NO in Step S33), or when CPU 731 determines that transition instruction does not indicate "WAKE" (NO in Step S35).

Then, CPU 731 controls switching unit 733 such that the reference oscillation signal to be supplied from input I/F 735 is supplied from the side of crystal oscillator 900. Therefore, the reference oscillation signal is supplied from crystal oscillator 900 through input I/F 735, and the supplied reference oscillation signal is imparted to PLL circuit 710 through output I/F 734.

At this point, CPU 731 reads data 737 of the CPU frequency-dividing ratio and system frequency-dividing ratio corresponding to the imparted state transition instruction signal ("WAKE"), that is, the active mode, and CPU 731 imparts data 737 to PLL circuit 710. Accordingly, PLL circuit 710 performs the frequency dividing to the reference oscillation signal imparted from crystal oscillator 900 according to the frequency-dividing ratio data imparted from power mode state machine 703. The system clock (120 MHz) and CPU clock (60 MHz) signals are generated and supplied by the frequency dividing. Therefore, the 60-MHz CPU clock is supplied to CPU core 704 and the 120-MHz system clock is supplied to other units of BU processor 700 (Step S37).

Then, CPU 731 updates data 736 of memory 732 such that data 736 indicates "active mode" (Step S39).

Thus, the electric power consumption can be reduced by switching the power mode of BU processor 700 to the three different states (sleep mode, standby mode, and active mode) which differ from one another in the frequency (operating frequency) of the clock signal supplied to the circuit in the BU processor 700 and the number of operating circuits.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information-communication terminal which conducts communication through a wireless network, the information-communication terminal comprising:
   a communication unit conducting communication with an external device through said wireless network using a frame;
   a power supply unit supplying an electric power to circuits in said communication unit;
   a frequency determination unit determining an operating frequency of said circuits; and
   a clock circuit supplying a clock having said operating frequency determined by said frequency determination unit to said circuits in said communication unit, wherein:
   an operation mode of said communication unit is switched to one of a sleep mode, a standby mode, and an active mode, wherein each mode is a state in which electric power is supplied to said communication unit by the power supply unit; said clock circuit stopping said clock supplied to said circuits in said communication unit in said sleep mode; said frequency determination unit setting said operating frequency at a predetermined first frequency in said standby mode; and said frequency determination unit setting said operating frequency at a second frequency higher than said first frequency in said active mode.

2. The information-communication terminal according to claim 1, wherein said operation mode of said communication unit is alternately switched between said standby mode and said active mode in a communication waiting period during which said communication unit waits communication using said frame while said electric power is supplied.

3. The information-communication terminal according to claim 2, wherein said communication unit includes a timer, and
   said operation mode of said communication unit is alternately switched between said standby mode and said active mode according to a time measured by said timer in said communication waiting period.

4. The information-communication terminal according to claim 1, further comprising an information processing unit executing an application program, wherein;
   said operation mode of said communication unit is switched among said sleep mode, said standby mode, and said active mode according to an instruction; and
   said instruction being supplied from said application program in such a manner that said information processing unit executes said application program.

5. The information-communication terminal according to claim 4, wherein said information processing unit processes said frame received by said communication unit.

6. The information-communication terminal according to claim 1, wherein said wireless network is an ad hoc communication network.

7. The information-communication terminal according to claim 1, wherein said external device is another said information-communication terminal.

8. A wireless communication device installed in an information-communication terminal conducting communication through a wireless network, the wireless communication device comprising:
   a communication unit conducting communication with an external device through said wireless network using a frame;
   a power supply unit supplying an electric power to circuits in said communication unit;
   a frequency determination unit determining an operating frequency of said circuits;
   a clock circuit supplying a clock having said operating frequency determined by said frequency determination unit to said circuits in said communication unit, wherein:
   an operation mode of said communication unit is switched to one of a sleep mode, a standby mode, and an active mode, where each mode is a state in which electric power is supplied to said communication unit by the power supply unit; said clock circuit stopping said clock supplied to said circuits in said communication unit in said sleep mode; said frequency determination unit setting said operating frequency at a predetermined first frequency in said standby mode; and said frequency determination unit setting said operating frequency at a second frequency higher than said first frequency in said active mode.

9. A wireless communication network including a plurality of information-communication terminals, said plurality of information-communication terminals conducting wireless communication with one another wireless communication through said wireless communication network, wherein:

a first information-communication terminal in said plurality of information-communication terminals includes:

a communication unit conducting wireless communication with a second information-communication terminal in said plurality of information-communication terminals using a frame;

a power supply unit supplying an electric power to circuits in said communication unit;

a frequency determination unit determining an operating frequency of said circuits; and a clock circuit supplying a clock having said operating frequency determined by said frequency determination unit to said circuits in said communication unit, wherein:

an operation mode of said communication unit is switched to one of a sleep mode, a standby mode, and an active mode, wherein each mode is a state in which electric power is supplied to said communication unit by the power supply unit; said clock circuit stopping said clock supplied to said circuits in said communication unit in said sleep mode; said frequency determination unit setting said operating frequency at a predetermined first frequency in said standby mode; and said frequency determination unit setting said operating frequency at a second frequency higher than said first frequency in said active mode.

* * * * *